United States Patent [19]

Ore'

[11] Patent Number: 4,554,144

[45] Date of Patent: Nov. 19, 1985

[54] REMOVAL OF MAGNESIUM AND/OR ALUMINUM VALUES FROM IMPURE AQUEOUS PHOSPHORIC ACID

[75] Inventor: Fernando Ore', Whittier, Calif.

[73] Assignee: Occidental Research Corporation, Irvine, Calif.

[21] Appl. No.: 568,707

[22] Filed: Jan. 6, 1984

Related U.S. Application Data

[63] Continuation of Ser. No. 476,691, Mar. 18, 1983, abandoned.

[51] Int. Cl.[4] .............................................. C01B 25/16
[52] U.S. Cl. ................................ 423/321 R; 423/116; 423/158; 423/317; 423/465
[58] Field of Search ............... 423/316, 317, 319, 320, 423/321 R, 116, 158, 472, 465

[56] References Cited

U.S. PATENT DOCUMENTS 3,494,736  2/1970  Carothers et al. ............... 423/321 R
4,136,199  1/1979  Mills ................................ 423/321 R
4,243,643  1/1981  Mills ................................ 423/321 R

FOREIGN PATENT DOCUMENTS 55-21541  2/1980  Japan .............................. 423/321 R Primary Examiner—Gregory A. Heller
Attorney, Agent, or Firm—James F. Tao; William G. Gosz

[57] ABSTRACT

Magnesium and aluminum impurities are removed from aqueous phosphoric acid by treatment with a fluorine material and an alkali metal containing material in such a manner that the atomic ratio of fluorine to aluminum is adjusted so that it is greater than about 2 and the alkali metal plus magnesium to aluminum atomic ratio to a value no greater than about 2. In one embodiment the fluorine to aluminum ratio is below about 11, preferably between about 4 and about 8. By controlling such atomic ratios in the limits prescribed, a more purified aqueous phosphoric acid can be produced having a substantial reduction in the magnesium and aluminum content thereof. The process is useful for wet-process phosphoric acids. The process is also particularly useful for acids having low $P_2O_5$ content and/or high aluminum concentration. The purification process does not require evaporation for the removal of impurities, as for example fluorine as silicon tetrafluoride.

14 Claims, 1 Drawing Figure

REMOVAL OF MAGNESIUM AND/OR ALUMINUM VALUES FROM IMPURE AQUEOUS PHOSPHORIC ACID

This is a continuation of application Ser. No. 476,691 filed Mar. 18, 1983 now abandoned.

BACKGROUND OF THE INVENTION

It is known that when phosphoric acid is made by treating phosphoric rock with sulfuric acid, a substantial portion of the impurities in the rock are dissolved and are present in the resultant phosphoric acid. The principal impurities which are difficult to remove are complexes containing calcium, aluminum, silicon, fluorine, magnesium and sulfate. As is well known, the removal of such impurities is most difficult and troublesome for phosphate producers.

In many prior art phosphoric acid purification processes the impure phosphoric acid has been concentrated by evaporation at elevated temperatures. During the concentration step compounds of fluorine, principally in the form of silicon tetrafluoride is evolved. This heating in the concentration step, however, does not remove compounds such as aluminum and magnesium. Futhermore, the fluoride fumes driven off by the heating process are harmful to the environment if not recovered from the vent gases. Such recovery systems for fluoride fumes are expensive and troublesome to maintain. Furthermore, during the concentration step there is considerable scale formation and objectionable corrosion of equipment by the fluorine compounds.

It has also been proposed to recover the fluorine component of phosphoric acid and sodium fluosilicate, by adding sodium chloride to the acid and precipitating sodium fluosilicate. This purification procedure suffers from the disadvantage of introducing chloride into the acid which can cause corrosion of metals.

British Pat. No. 1,024,924 discloses a process for removing impurities from wet-process phosphoric acid at temperatures of about 130° C. at $P_2O_5$ concentrations greater than 30%. This latter process is difficult to run due to severe corrosion at the higher temperatures and the instability of the anyhydrite formed during processing.

A detailed description of a method for producing phosphoric acid by the dihydrate process can be found in U.S. Pat. No. 4,277,448 to Ore et al. Processes for preparing phosphoric acid by hemihydrate processes are described in U.S. Pat. No. 4,196,172 to Ore et al and U.S. Pat. No. 4,220,630 to Ore.

Processes for producing phosphoric acid from high alumina pebble rock and/or from unbeneficiated or partially beneficiated phosphate rock matrix are described in U.S. Pat. No. 4,284,614 to Ore and copending applications Ser. No. 378,456 filed May 17, 1982, by Eli Chemtob and Gary L. Beer and in Ser. No. 282,466 filed July 13, 1981 by Fernando Ore, the entire disclosure of both of said applications being hereby incorporated herein. The present invention can be especially useful as a means of controlling the magnesium and/or aluminum content of the various streams containing impure phosphoric acid described in said patent and applications.

When phosphoric acid is made by any of these processes, impurities in the rock are dissolved and are present in the resulting phosphoric acid. The principal impurities which are difficult to remove are compounds and complexes containing calcium, aluminum, silicon, fluorine, sulfate, and magnesium. Removal of these impurities is important because the phosphoric acid is usually concentrated up to about 48 to 54 weight percent $P_2O_5$ and, during storage, the impurities can precipitate to form a solid which is found objectionable by most consumers.

Many attempts have been made to remove impurities from wet process phosphoric acid. Exemplary of the techniques used are those described in U.S. Pat. Nos. 3,124,419; 3,206,282; 3,273,713; 3,379,501; 3,442,609; 3,481,700, and 3,642,439; and British Pat. Nos. 467,843 and 1,337,669. Methods described in these patents generally are complicated and difficult to use.

For example, British Pat. No. 1,337,669 discloses a process for precipitation of ionic metal impurities from phosphoric acid by adding an organic water soluble and alkali metal or ammonium ions thereto, filtering off the precipitate, then passing the filtered solvent/phosphoric acid phase through a strongly acid cation exchange resin and, finally, removing the solvent from the purified acid by distillation.

U.S. Pat. No. 3,642,439 to Moore et al, discloses a process for removing magnesium impurities from weak, wet process phosphoric acid by evaporating the acid until the $SiO_2$ content of the acid is reduced to less than 0.2%, maintaining the evaporated acid at 50°–100° C. for at least 15 hours to form a precipitate comprising a magnesium-aluminum-fluoride-phosphate complex compound and separating the precipitate from the purified, concentrated phosphoric acid. Further disclosed is the addition of a "seeding" compound having a weight ratio of magnesium oxide to aluminum oxide of 1 to 1.4 and a ratio of magnesium oxide to fluorine of 1 to 2.2.

U.S. Pat. No. 4,229,804 to Parks describes a means of removing magnesium from impure phosphoric acid which has not been concentrated by evaporation and which can be relatively dilute with respect to $P_2O_5$ analysis.

U.S. Pat. Nos. 4,136,199 and 4,243,643 to Mills discloses a process for removing metal ion impurities from concentrated or unconcentrated phosphoric acid by adding a precipitant, or reagent, which comprises ions of calcium and fluorine to cause precipitation of a fluoride solid which contains ions of magnesium and of other metals such as aluminum and sodium. The precipitant can be a solid comprising calcium fluoride, such as the sludge obtained by treating pond water from a phosphoric acid plant with lime or limestone (sometimes hereinafter called "Synspar") as described in U.S. Pat. No. 4,171,342 to Hirko et al. Other reagents disclosed are calcium fluoride and various synthetic fluorspars (e.g., U.S. Pat. No. 3,907,978; U.S. Pat. No. 4,043,803; U.S. Pat. No. 2,914,474; U.S. Pat. No. 2,780,523; U.S. Pat. No. 2,780,521; U.S. Pat. No. 3,379,501 and U.S. Pat. No. 3,800,029).

U.S. Pat. No. 4,264,563 to Sikdar describes a process for the preparation of a calcium fluoride-containing solid which does not contain significant amounts of free silica, e.g. silica gel or a silica sol. It is further disclosed that free silica in calcium fluoride solids used for treating impure phosphoric acid could interfere with the removal of contaminants from the phosphoric acid. The calcium fluoride-containing material can be used in the present invention.

There is a need for a process which is relatively simple and economical and which does not require evaporation to remove impurities from phosphoric acid. Evaporative processes to remove, for example, fluorine, typically a silicon tetrafluoride or fluosilicic acid, are environmentally undesirable, and capital and operating costs are intensive because of the requirement for expensive and troublesome pollution abatement systems.

Furthermore, the process should be such that there is little phosphorous, or $P_2O_5$ lost as a result of the impurity removal process. For example, if the impurities are removed as a complex precipitate, such precipitate should not have substantial amounts of phosphorous (or $P_2O_5$ values) in the form of a solid substance as part of the structure of the complex precipitate.

As used herein, the word "values" means a material which upon analysis contains the indicated element in chemical combination or, in the case of "$P_2O_5$," contains the element phosphorous, in some chemical combination.

The present invention provides a process which does not have many of the above-described problems and disadvantages.

SUMMARY OF THE INVENTION

The present invention involves adding a sodium compound to an impure aqueous, phosphoric acid containing dissolved ions of aluminum, and fluorine (and, usually, of magnesium) and aging the resulting sodium-containing acid until a precipitate forms. The precipitate can contain chemically combined sodium, aluminum, and fluorine, and usually magnesium. In general, chemical analysis of the major portion of the precipitate will correspond to the empirical formula: $K_uNa_vMg_wAl_xF_y(H_2O)_z$ where u,v,w,x,y and z are positive integers and where one or two of u, v, and w can be zero. z can also be zero.

The phosphoric acid being treated can be dilute (e.g. as low as 22% $P_2O_5$, more preferred 26%) or concentrated (e.g. "merchant grade" or about 54% $P_2O$) Especially preferred are hemihydrate phosphoric acids containing in the range of about 36–52% $P_2O_5$ and which more preferably have not been concentrated by evaporation.

When the impure phosphoric acid is low in magnesium, the addition of an alkali metal (preferably sodium, less preferred potassium or both sodium and potassium) will accelerate the formation of a solid precipitate, comprising the alkali metal, magnesium, aluminum and fluorine, and this solid can be separated from the phosphoric acid by known means, such as filtration, centrifugation, settling and decantation, etc, Especially preferred methods of separation of said solids are those described in U.S. Pat. No. 4,235,584 to Smith et al, U.S. Pat. No. 4,313,919 to Richards et al and in copending U.S. application Ser. No. 358,744 of Hollifield and Smith filed Mar. 16, 1982, and Ser. No. 378,456 filed May 17, 1982, the entire disclosure of said applications being hereby incorporated herein.

The invention includes a process for removing dissolved aluminum from impure aqueous phosphoric acid containing dissolved aluminum, said process comprising (a) adding a fluorine-containing compound and a sodium-containing compound to said impure aqueous phosphoric acid in amounts effective to cause the formation of a solid compound comprising sodium, aluminum and fluorine; and (b) separating said solid compound from said impure aqueous phosphoric acid to obtain an aqueous phosphoric acid containing less alumunum than did said impure aqueous phosphoric acid.

In one embodiment, the effective amount causes formation of a solid compound consisting essentially of sodium, aluminum and fluorine.

The impure aqueous phosphoric acid can analyze in the range of about 22% by weight to about 54% by weight of $P_2O_5$.

The impure aqueous phosphoric acid need not have been concentrated by evaporation of water and silicon tetrafluoride therefrom.

In one embodiment, the solid comprising sodium, aluminum and fluorine has an X-ray diffraction pattern similar to that of ralstonite. In another embodiment, the impure aqueous phosphoric acid contains sufficient dissolved magnesium to cause the formation of a solid compound comprising sodium, magnesium, aluminum and fluorine, and corresponding to the formula above and provide an ionic balance for the F.

Preferably, added fluorine-containing compound also contains calcium, and, more preferred sulfuric acid is added to the impure phosphoric acid to provide an amount at least approximately ionically equivalent to the fluorine in said fluorine-containing compound. For example, the sulfuric acid can be added to said phosphoric acid in an amount approximately ionically equivalent to the calcium in said fluorine-containing compound which also contains calcium. In a preferred embodiment said added fluorine-containing compound which also contains calcium comprises a solid produced by contacting phosphoric acid plant pond water with at least one member of the class selected from lime and limestone.

In one embodiment, the impure aqueous phosphoric acid is a component of a solid calcium sulphate-containing slurry produced by the action of sulphate ion on a solution of a calcium phosphate-containing mineral in aqueous phosphoric acid. In another embodiment, said impure aqueous phosphoric acid can be the product of separation of solid calcium sulphate from a slurry comprising impure aqueous phosphoric acid and solid calcium sulphate.

The present invention comprises a process for purifying impure phosphoric acid which is relatively simple and which, in a preferred embodiment, does not require evaporation. It is, therefore, one objective of this invention in a preferred but not limiting embodiment, to produce a purified phosphoric acid by a process which does not require evaporation, especially evaporation for the primary purpose of vaporizing siliceous compounds It is another objective of this invention to produce from an impure phosphoric acid which contains dissolved therein aluminum and magnesium values, an improved phosphoric acid which has a greatly reduced amount, if any, of dissolved aluminum and magnesium values.

Another objective of one embodiment of this invention is to remove other undesirable dissolved impurities from phosphoric acid such as fluorine and silicon. In another embodiment of this invention it is an objective to remove impurities from impure phosphoric acid by forming a precipitate therefrom comprising chemically combined sodium, aluminum and fluorine, and which also can contain other chemically formed elements, such as magnesium and which has as a major constituent a material closely resembling a mineral selected from the group consisting of ralstonite, TVA ralstonite, chiolite, cryolite, and mixtures thereof. Hereinafter, this precipitate will sometimes be referred to as an Na—Al—F precipitate. As used herein the term "Na—Al—F"

precipitate includes the previously defined solid of formula $K_uNa_vMg_wAl_xF_y(H_2O)_z$, it being understood that potassium is an equivalent to sodium. Cryolite is not usually found under the conditions of the present process.

In a still further embodiment of this invention, an objective is to form a precipitate of impurities of phosphoric acid which precipitate contains at most only a minor amount of phosphorous values in the form of a solid substance. Thus, although aqueous phosphoric acid may be entrained in the solid Na—Al—F precipitate, only minor amounts, if any, of solid phosphorous values are in the Na—Al—F precipitate.

An especially useful embodiment involves adding sufficient amounts of a compound containing fluorine to cause, at a given aging time and aging temperature, the first formation of a solid resembling natural ralstonite in composition and X-ray diffraction patterns. This solid can also frequently contain compounds of silicon. One or more compounds can be added to enhance the precipitation of solids containing aluminum, including sodium fluorosilicate (especially when no evaporation step has been used to remove fluorine). Alternately, potassium compounds can be used or both sodium and potassium compounds. In many impure phosphoric acids in order for the Na—Al—F precipitate to form, the silica level must be reduced and the use of an alkali metal compound, as described herein, can cause this reduction.

FURTHER DESCRIPTION

This invention can involve a method for the removal of dissolved magnesium and aluminum values from aqueous phosphoric acid comprising adjusting the atomic ratio of dissolved fluorine to dissolved aluminum in the aqueous phosphoric acid to a value greater than about 2 by adding a fluorine containing first material thereto, adjusting the atomic ratio of dissolved potassium plus dissolved sodium plus dissolved magnesium to dissolved aluminum in the aqueous phosphoric acid to a value no greater than about 2 by adding an alkali metal containing second material to the acid, the second material being selected from the group consisting of compounds of sodium, potassium, and mixtures thereof (more preferred said second material consists essentially of one or more compounds of sodium) allowing a precipitate containing magnesium and aluminum values to form, and separating aqueous phosphoric acid from the thusly formed precipitate, thereby producing an aqueous phosphoric acid having reduced amounts of dissolved magnesium and aluminum values.

Dissolved magnesium and aluminum values can be removed from aqueous phosphoric acid by adjusting the atomic ratio of dissolved fluorine to dissolved aluminum in the acid to a value no greater than about 2 by adding a fluorine containing first material thereto, adjusting the atomic ratio of dissolved sodium plus dissolved magnesium to dissolved aluminum in the acid to a value no greater than about 2 by adding a sodium containing second material to the acid, allowing a precipitate containing magnesium and aluminum values to form, and separating aqueous phosphoric acid from the precipitate thereby producing an aqueous phosphoric acid having reduced amounts of dissolved magnesium and aluminum values.

Nonlimiting examples of the fluoride-containing material are compositions comprising compounds of calcium and fluorine, such as calcium fluoride, a calcium fluoride-containing material, such as fluorspar and "Synspar." Synspar is a sludge-like precipitant obtained by adding a calcium compound, such as calcium carbonate or calcium hydroxide, to wet-process phosphoric acid plant "pond water." Methods for producing such a sludge precipitate are described, for example, in U.S. Pat. Nos. 2,780,523; 2,976,119; 3,151,9381; 3,625,648; and 3,907,978. One especially preferred method for producing such a sludge precipitate is described in U.S. Pat. No. 4,171,342 of Hirko et al. The sludge prepared by this method, which is sometimes referred to herein as "Synspar," typically contains about 50% by weight water on a dry basis by weight. The solids in such a sludge precipitate when analyzed typically contain about 3 to about 10% phosphorous which is probably present as $PO_4$, about 0.05 to about 0.3% magnesium, about 20 to about 35% calcium, about 0.3 to about 3% iron, about 1 to about 5% alumunum, about 0.7 to about 3.0% sodium, about 0.5 to about 8% silicon, about 13 to about 30% fluorine, and about 3 to about 15% sulfate.

In one embodiment of this invention the anion of the alkali metal containing material is selected from the group consisting of nitrates, carbonates, hydroxides, sulfates, sulfites and fluorides (e.g., sodium carbonate, sodium bicarbonate, sodium hydroxide, sodium sulfate, potassium carbonate, potassium hydroxide, potassium sulfate) and mixtures thereof. Sodium containing materials are preferred, preferably selected from the group consisting of sodium fluoride, sodium carbonate, sodium hydroxide, sodium sulfate, and mixtures thereof. The fluorine containing material and the alkali metal containing material can be, if desired, the same material, for example sodium fluoride, sodium hydrogen fluoride ($NaHF_2$), e.g. from contacting HF vapors with solid NaF, or other compounds or mixtures containing fluorine and sodium or potassium.

In one embodiment of this invention an improved-aqueous phosphoric acid which contains dissolved Al, Mg, Fe, Si and F values is purified by treating with a fluoride containing material and an alkali metal containing material to form a Na—Al—F precipitate having as a major constituent a material closely resembling a mineral selected from the group consisting of ralstonite, TVA ralstonite, chiolite, cyrolite, and mixtures thereof, the Na—Al—F precipitate having no more than, at most, a minor amount of phosphorous values in the form of a solid substance contained therein, and to form a purified aqueous phosphoric acid having a greatly reduced dissolved aluminum to dissolved $P_2O_5$ mole ratio and a greatly-reduced dissolved Mg to dissolved $P_2O_5$ mole ratio relative to such mole ratios in the untreated improved-aqueous phosphoric acid. In a further embodiment the amounts of the fluorine containing and alkali metal containing materials added to the phosphoric acid are such that the Na—Al—F or Na—Mg—Al—F precipitate has an average atomic ratio of dissolved sodium and potassium plus dissolved magnesium to dissolved aluminum of between about 0.7 and about 2.1, and an average atomic ratio of F/Al of between about 2.7 and about 6.

When the dissolve sodium plus dissolved magnesium to dissolved aluminum atomic ratio is adjusted to no greater than about 2, the amount and chemical character of the fluorine and sodium containing materials added to the phosphoric acid can be operative to form an Na—Al—F precipitate having as a major constituent a material closely resembling a mineral selected from the group consisting of ralstonite, TVA ralstonite, chiolite, cryolite, and mixtures thereof, and wherein the precipitate has no more than at most a minor amount of phosphorous values in the form of a solid substance contained therein.

An illustration of practice of the invention comprises dissolving a phosphate ore which comprises Ca, $P_2O_5$, Al, Mg, Fe, Si, and F values, selected from the group consisting of as-mined ore, beneficiated ore, partially beneficiated ore (including high alumina pebble), and mixtures thereof, in a recycled aqueous phosphoric acid, typically containing sulfuric acid, thereby producing a raw aqueous phosphoric acid-solid mixture, separating undissolved solids from the acid-solid mixture thereby producing a raw aqueous phosphoric acid, adding sulfuric acid to the raw acid to precipitate a calcium sulfate, separating the precipitated calcium sulfate from the raw phosphoric acid to produce an improved-aqueous phosphoric acid, using a part of the improved-aqueous phosphoric acid as the recycled aqueous phosphoric acid used to dissolve the phosphate ore, mixing with a second part of the improved-aqueous phosphoric acid a fluorine containing material and a sodium containing material, the amounts of such materials being operative to adjust the dissolved fluorine to dissolved aluminum atomic ratios therein to no greater than about 2, to adjust the dissolved sodium plus dissolved magnesium to dissolved aluminum atomic ratio to no greater than about 2, to form a Na—Al—F precipitate having as a major constituent a material closely resembling a mineral or substance selected from the group consisting of ralstonite, TVA ralstonite, chiolite, cryolite, and mixtures thereof, the precipitate having no more than at most a minor amount of phosphorous values in the form of a solid substance contained therein and to form a purified aqueous phosphoric acid having a greatly reduced dissolved aluminum to dissolved $P_2O_5$ mole ratio and a greatly reduced dissolved Mg to dissolved $P_2O_5$ mole ratio relative to the mole ratio in the improved-aqueous phosphoric acid, and separating the aqueous phosphoric acid from the Na—Al—F precipitate.

In another illustration of practice of the invention the amount and chemical character of the fluoride-containing and alkali metal containing materials used to treat the aqueous phosphoric acid is such that at least about 80% of the dissolved magnesium in the feed aqueous phosphoric acid is removed and transferred to the Na—Al—F precipitate. In a further embodiment the amount and chemical character of such reagent materials are operative to remove and transfer at least about 80% of the dissolved aluminum from the aqueous phosphoric acid to the precipitate. In a further embodiment the amounts and chemical character of such reagent materials are also operative to remove and transfer at least about 70% of the dissolved sodium from the aqueous phosphoric acid to the precipitate.

It is desirable to adjust the atomic ratio of dissolved fluorine to dissolved aluminum in the aqueous phosphoric acid being treated so that such ratio is no greater than about 11. Further, the atomic ratio of dissolved fluorine to dissolved aluminum in the aqueous phosphoric acid being treated can be controlled so that it is between about 5 and about 10.

In general, the removal of aluminum and magnesium from wet-process phosphoric acid (which can be produced by a hemihydrate process or a dihydrate process) can be effected by maintaining a fluorine to aluminum atomic ratio above about 2 and the alkali metal plus magnesium to aluminum atomic ratio to no greater than about 2. Preferably, the fluorine to aluminum atomic ratio is less than 11, more preferably, between about 4 and about 10, and most preferably, between about 5 and about 8. The preferred source of fluorine is a synthetic fluorspar (e.g. Synspar). In this example of practice of the invention the treatment of phosphoric acid with a material containing alkali metal and a material containing fluorine removes aluminum and magnesium by precipitating a substance containing magnesium and resembling natural ralstonite, i.e., $NaMgAlF_6$, known in the literature as "TVA ralstonite," along with non-magnesium substances closely resembling minerals such as cryolite, i.e. $Na_3AlF_6$, and chiolite, i.e. $Na_5Al_3F_{14}$, and ralstonite.

It has also been found that the treatment with an alkali metal material promotes the precipitation of fluoro-aluminate compounds in aqueous phosphoric acids of lower $P_2O_5$ content, for example 27% $P_2O_5$, than previously practiced. Furthermore, it has been found that such alkali metal treatment in accordance with this invention gives improved impurity removal for aqueous phosphoric acids having relatively high aluminum contents.

DESCRIPTION OF A PREFERRED EMBODIMENT

Figure 1:
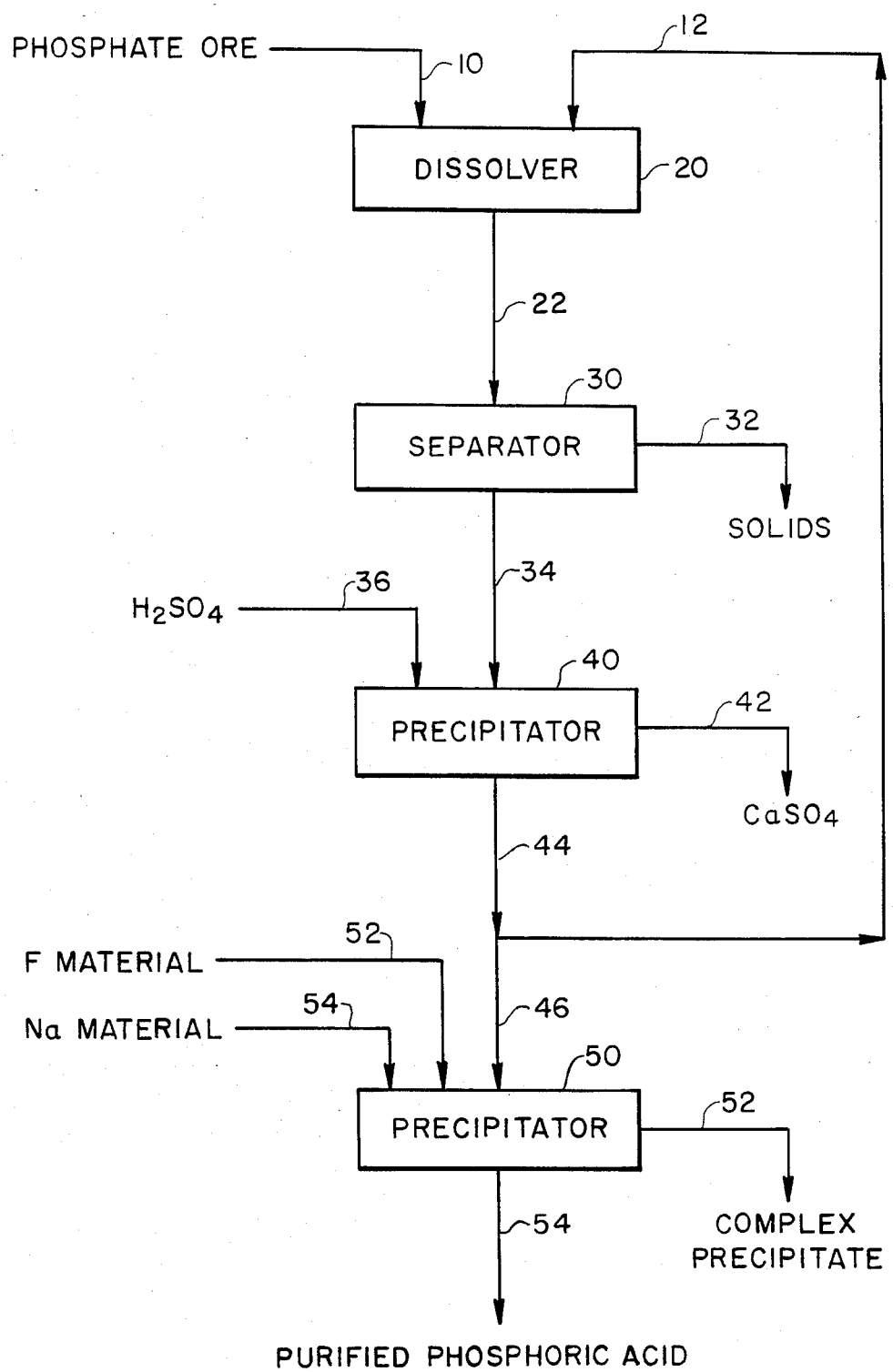
FIG. 1 is a flow diagram of a preferred embodiment of this invention for producing purified phosphoric acid from phosphate ore.

Referring to FIG. 1, a calcium-containing phosphate ore in stream 10 and a recycled-aqueous phosphoric acid (which typically also contains sulfuric acid) in stream 12 is charged to dissolver vessel 20 wherein phosphate values and impurities are dissolved in the recycled phosphoric acid and calcium in the ore reacts with the sulphuric acid in the recycle aqueous phosphoric acid to produce solid calcium sulfate (e.g., gypsum). By phosphate ore as used herein is meant phosphate ore as mined (e.g. matrix) or as beneficiated to various degrees. As used herein, the term "beneficiated" includes such processes as screening, washing, floatation, drying, calcination, etc. Dissolver 20 is preferably an agitated vessel suitable for handling phosphoric acid slurrys. A slurry comprising raw aqueous phosphoric acid and solid calcium sulphate is removed from the dissolver in stream 22 and introduced into separator 30 wherein any undissolved solids are separated and removed in stream 32. A raw aqueous phosphoric acid stream 34 is removed from the separator and charged together with sulfuric acid in stream 36 to precipitator 40 wherein a calcium sulphate precipitate is formed. The calcium sulfate precipitate is removed from the preciptator in stream 42. An improved-phosphoric acid is removed from the precipitator in stream 44 and thereafter divided into a first part which is recycled to dissolver 20 as recycled-aqueous phosphoric acid stream 12. A second part of the improved-phosphoric acid in stream 46 is introduced into precipitator 50 along with a fluoride containing material from stream 52 and a sodium containing material from stream 54. The amount of the fluoride containing material charged to precipitator 50 is such that the dissolved fluorine to dissolved aluminum and atomic ratio in the phosphoric acid in precipitator 50 is adjusted to between about 4 and about 8. The amount of the sodium-containing material introduced in stream 54 is such that the dissolved sodium plus dissolved magnesium to dissolved aluminum atomic ratio in the phosphoric acid in precipitator 50 is adjusted to a value not exceeding 2. The preferred source of fluorine-containing material is a synthetic fluorspar (e.g. Synspar). The preferred sodium materials include sodium carbonate, sodium hydroxide, and sodium sulfate. Availability and cost will be a major consideration for the choice and source of the alkali metal-containing material.

Preferably, precipitator 50 is agitated to provide good contact between the fluorine and sodium-containing materials and phosphoric acid. After suitable agitation, a complex precipitate is allowed to form, which has a chemical analysis and X-ray diffraction pattern which closely resembles ralstonite, TVA ralstonite, chiolite or cryolite. Mixtures of such precipitate substances are typically formed. The complex precipitate is removed from the precipitator in stream 52, and a purified aqueous phosphoric acid in stream 54.

The present invention is useful for purifying acid produced by the hemihydrate or dihydrate processes. Both of these types of phosphoric acids contain many impurities such as magnesium, calcium, iron, aluminum, sodium, silicon, fluorine, sulfate, uranium, and other impurities. Typically, these acids contain from about 0.3 to about 1.75% by weight MgO. The amount and types of impurities in hemihydrate process phosphoric acid can be different than the amount and type of impurities in dihydrate process phosphoric acid. (e.g., see U.S. Pat. No. 4,243,673).

The various precipitates can be separated from the treated wet-process phosphoric acid by conventional techniques (e.g. filtration, decantation, centrifuging). A preferred technique, however, is vacuum filtration, such as described, for example, in U.S. Pat. Nos. 4,235,584 and 4,313,919, and U.S. patent application Ser. No. 358,744 filed Mar. 16, 1982, of Hollifield and Smith.

By increasing the cations available in unpurified phosphoric acid through the addition of alkali metal-containing compounds as described herein, the ability to precipitate fluoroaluminates in the acid is improved. Furthermore, treatment with alkali metal compounds also promotes the precipitation of aluminum and magnesium acids of lower $P_2O_5$ content and/or acids containing high aluminum concentrations.

An atomic ratio of fluorine to aluminum greater than about 2, preferably no greater than 11, and most preferably between about 4 and about 8 are used to insure that only fluoroaluminate complex ions, i.e. $AlF_4-$, $AlF_6-$, are precipitated thereby avoiding the precipitation of falphite, ($AlHFPO_4-2H_2O$), and related compounds (e.g., see copending applications Ser. No. 282,465, filed July 13, 1981, and Ser. No. 282,466, filed July 13, 1981 which are incorporated herein. Precipitation of aluminum-fluorine compounds which contain phosphorous values such as falphite is to be avoided or at least minimized in order to prevent loss of phosphorous values in the complex precipitate.

By adjusting the fluorine to aluminum atomic ratio and the alkali metal plus magnesium to aluminum atomic ratio, as prescribed herein, formation of a precipitate containing phosphorous values is largely avoided.

Furthermore, as mentioned, the present invention is especially useful for phosphoric acids having low $P_2O_5$ content or having high dissolved aluminum content.

EXAMPLES

Twenty statistically designed experiments using synthetic acids were conducted. $P_2O_5$ contents of 27 and 50% were used to simulate those encountered in wet-process phosphoric acid production involving the crystallization of calcium sulfate as the di-or hemihydrate. Table 1 shows the feed composition of the phosphoric acid for the 20 experiments as analyzed. Table 2 gives the product acid composition of the 20 experiments.

Table 3 gives the solid composition in weight percent. Table 4 gives the empirical formula of the precipitate, the fluorine to aluminum and sodium plus magnesium to aluminum atomic ratio for the 20 experiments. The major and minor crystaline structures of the precipitate were identified by X-ray identification. Major constituents are identified by (MM) and minor constituents by (M).

Tables 5 and 6 showed a separation of components between the purified acids and the complex precipitates.

All percents, discussed herein, are to be understood as being on a weight basis unless otherwise indicated.

In the statistically designed experiments, fluorine to aluminum atomic ratios of 4, 6 and 8 were used to insure that only fluoro aluminate complex ions were precipitated thereby avoiding the precipitation of phosphorous values such as falphite. The added fluorine was provided by fluorosilicic acid. A constant amount of magnesium oxide of 0.8% was used in all experiments. Sodium as sodium hydroxide was added to bring the sodium plus magnesium to aluminum atomic ratios to one of three levels, 0.5, 1.0, or 2.0. Other additions and constant amounts in all experiments were 0.1% $SiO_2$, 1.2% $Fe_2O_3$, and 2.0% $SO_4$.

From the date it can be seen that on the average, 75% of the $Al_2O_3$ was removed along with 81% of the MgO, 83% of the $Na_2O$, 67% of the fluorine, and 8% of the $Fe_2O_3$. Both $P_2O_5$ and sulfate concentrations were increased on the average by about 3 and 40%, respectively.

In the present invention, the addition of compounds containing alkali metals removes more aluminum by precipitating ralstonite ($NaMgAlF_6$), along with non-magnesium containing compounds such as cryolite ($Na_3AlF_6$), and chiolite ($Na_5Al_3F_{14}$).

The process of the invention has been described generally, and by example presented for clarity and illustration only. It will be apparent to those skilled in the art from the foregoing that various modifications of the process and the materials disclosed herein can be made without departure from the spirit and scope of the invention. Accordingly, the invention is not to be limited to the specific embodiments illustrated, but as defined in the following claims. When ralstonite is referred to herein it means a composition that can have very little or no magnesium and usually consists essentially of sodium, aluminum, and fluorine. TVA ralstonite consists essentially of magnesium, aluminum, and fluorine.

TABLE 1

| | Feed Composition - Analyzed Weight % - Wet Basis | | | | | | | |
|---|---|---|---|---|---|---|---|---|
| Exp. No. | $P_2O_5$ | Al | Mg | Na | F | Fe | Si | $SO_4$ |
| 1 | 27.10 | 1.40 | 0.45 | 0.34 | 5.26 | 1.20 | 0.97 | 2.13 |
| 2 | 30.00 | 1.50 | 0.50 | 0.95 | 4.73 | 0.97 | 0.55 | 2.28 |
| 3 | 50.00 | 1.40 | 0.47 | 0.26 | 2.44 | 0.87 | 0.25 | 2.99 |
| 4 | 28.00 | 0.41 | 0.40 | 0.00 | 1.25 | 0.85 | 0.10 | 2.69 |
| 5 | 51.20 | 0.52 | 0.44 | 0.35 | 0.57 | 0.83 | 0.14 | 2.75 |
| 6 | 29.00 | 1.50 | 0.31 | 2.90 | 2.50 | 0.85 | 0.00 | 2.29 |

TABLE 1-continued

| | Feed Composition - Analyzed Weight % - Wet Basis | | | | | | | |
|---|---|---|---|---|---|---|---|---|
| Exp. No. | P$_2$O$_5$ | Al | Mg | Na | F | Fe | Si | SO$_4$ |
| 7 | 27.60 | 2.20 | 0.45 | 0.76 | 8.00 | 0.84 | 0.71 | 2.10 |
| 8 | 27.60 | 2.10 | 0.44 | 1.80 | 9.60 | 0.84 | 1.20 | 2.24 |
| 9 | 51.20 | 0.51 | 0.44 | 0.01 | 1.60 | 0.83 | 0.08 | 2.20 |
| 10 | 28.20 | 1.40 | 0.45 | 2.50 | 5.40 | 0.84 | 0.25 | 2.23 |
| 11 | 49.30 | 1.70 | 0.45 | 0.76 | 2.61 | 0.80 | 0.06 | 2.06 |
| 12 | 49.00 | 0.56 | 0.47 | 0.00 | 1.81 | 0.80 | 0.07 | 2.18 |
| 13 | 27.10 | 0.47 | 0.42 | 0.01 | 3.71 | 0.79 | 0.12 | 2.09 |
| 14 | 45.90 | 1.60 | 0.43 | 1.90 | 4.52 | 0.72 | 0.41 | 1.94 |
| 15 | 28.00 | 0.48 | 0.44 | 0.31 | 2.00 | 0.77 | 0.04 | 2.12 |
| 16 | 25.20 | 2.60 | 0.43 | 0.70 | 6.82 | 0.73 | 0.50 | 2.00 |
| 17 | 27.00 | 2.65 | 0.40 | 4.10 | 11.16 | 0.77 | 0.05 | 1.98 |
| 18 | 27.50 | 2.35 | 0.44 | 1.40 | 4.75 | 0.75 | 0.13 | 1.90 |
| 19 | 28.50 | 0.47 | 0.46 | 0.33 | 2.08 | 0.76 | 0.11 | 2.05 |
| 20 | 28.00 | 0.42 | 0.44 | 0.00 | 1.18 | 0.75 | 0.04 | 2.03 |

TABLE 2

| | Product Phosphoric Composition Weight % - Wet Basis | | | | | | | |
|---|---|---|---|---|---|---|---|---|
| Exp. No. | P$_2$O$_5$ | Al | Mg | Na | F | Fe | Si | SO$_4$ |
| 1 | 31.03 | 0.67 | 0.01 | 0.06 | 5.48 | 1.31 | 1.22 | 2.65 |
| 2 | 35.06 | 0.22 | 0.00 | 0.08 | 2.41 | 1.48 | 0.60 | 2.88 |
| 3 | 37.79 | 0.52 | 0.11 | 0.04 | 1.26 | 0.52 | 0.54 | 1.93 |
| 4 | 28.40 | 0.33 | 0.31 | 0.00 | 0.61 | 0.81 | 0.23 | 2.30 |
| 5 | 49.36 | 0.04 | 0.11 | 0.07 | 0.65 | 0.75 | 0.20 | 2.24 |
| 6 | 30.30 | 0.93 | 0.16 | 1.26 | 1.29 | 0.75 | 0.00 | 2.46 |
| 7 | 20.34 | 0.61 | 0.01 | 0.07 | 2.50 | 0.56 | 0.71 | 1.79 |
| 8 | 32.09 | 0.51 | 0.01 | 0.13 | 8.07 | 1.07 | 1.91 | 3.06 |
| 9 | 50.24 | 0.14 | 0.12 | 0.02 | 0.70 | 0.79 | 0.14 | 2.26 |
| 10 | 24.03 | 0.00 | 0.01 | 0.33 | 0.81 | 0.65 | 0.00 | 1.92 |
| 11 | 50.93 | 0.78 | 0.19 | 0.48 | 1.87 | 0.67 | 0.07 | 4.48 |
| 12 | 52.32 | 0.05 | 0.05 | 0.01 | 0.53 | 0.69 | 0.08 | 4.27 |
| 13 | 27.43 | 0.02 | 0.02 | 0.02 | 0.92 | 0.65 | 0.14 | 4.91 |
| 14 | 52.14 | 0.03 | 0.01 | 0.26 | 2.76 | 0.61 | 0.41 | 6.27 |

TABLE 2-continued

| | Product Phosphoric Composition Weight % - Wet Basis | | | | | | | |
|---|---|---|---|---|---|---|---|---|
| Exp. No. | P$_2$O$_5$ | Al | Mg | Na | F | Fe | Si | SO$_4$ |
| 15 | 25.92 | 0.36 | 0.36 | 0.36 | 0.82 | 0.58 | 0.07 | 0.27 |
| 16 | 29.40 | 0.34 | 0.00 | 0.05 | 9.18 | 0.72 | 1.67 | 0.34 |
| 17 | 31.79 | 0.03 | 0.04 | 0.49 | 1.56 | 0.66 | 0.23 | 4.57 |
| 18 | 29.63 | 0.68 | 0.01 | 0.20 | 1.45 | 0.76 | 0.00 | 2.98 |
| 19 | 27.15 | 0.02 | 0.07 | 0.09 | 0.65 | 0.68 | 0.13 | 1.84 |
| 20 | 27.45 | 0.24 | 0.24 | 0.03 | 0.43 | 0.66 | 0.04 | 2.37 |

TABLE 3

| | Solids Composition Weight % - Dry Basis | | | | | | | | |
|---|---|---|---|---|---|---|---|---|---|
| Exp. No. | P$_2$O$_5$ | Al | Mg | Na | F | Fe | Si | SO$_4$ | Wts |
| 1 | 10.30 | 14.00 | 6.57 | 3.49 | 37.31 | 0.56 | 0.60 | 0.49 | 5.61 |
| 2 | 18.00 | 11.70 | 4.01 | 6.38 | 34.15 | 0.81 | 1.10 | 0.93 | 11.95 |
| 3 | 16.10 | 12.80 | 6.10 | 3.50 | 31.90 | 0.21 | 0.50 | 1.00 | 4.14 |
| 4 | 0.00 | 12.60 | 10.90 | 0.13 | 41.65 | 0.22 | 0.90 | . | 1.45 |
| 5 | 11.00 | 12.80 | 2.50 | 18.90 | 40.09 | 0.69 | 0.90 | 0.84 | 3.92 |
| 6 | 0.00 | 12.90 | 2.44 | 18.30 | 40.35 | 0.69 | 0.00 | 3.32 | 9.93 |
| 7 | 32.50 | 8.30 | 2.20 | 3.30 | 17.50 | 1.10 | 2.65 | 0.70 | 18.31 |
| 8 | 1.24 | 17.90 | 4.10 | 15.30 | 35.31 | 0.13 | 2.60 | 0.74 | 11.72 |
| 9 | 3.70 | 13.50 | 8.70 | 0.06 | 40.79 | 0.83 | 0.00 | 0.94 | 2.51 |
| 10 | 3.30 | 14.70 | 8.80 | 9.60 | 30.01 | 0.57 | 0.00 | 0.57 | 9.28 |
| 11 | 14.40 | 13.20 | 5.18 | 8.31 | 40.80 | 0.25 | 3.02 | 0.29 | 5.13 |
| 12 | 3.40 | 12.80 | 12.30 | 0.17 | 51.20 | 0.09 | 2.85 | 0.52 | 3.27 |
| 13 | 1.50 | 12.80 | 12.60 | 0.07 | 40.50 | 0.32 | 2.60 | 0.19 | 3.15 |
| 14 | 5.00 | 13.40 | 4.29 | 18.90 | 32.00 | 0.62 | 5.39 | 0.95 | 9.54 |
| 15 | 5.00 | 11.90 | 9.39 | 9.17 | 42.70 | 0.72 | 1.35 | 0.35 | 0.85 |
| 16 | 1.00 | 16.50 | 5.11 | 8.49 | 47.60 | 0.13 | 0.63 | 0.34 | 8.07 |
| 17 | 2.50 | 13.60 | 2.41 | 21.80 | 35.60 | 0.76 | 1.86 | 1.14 | 15.97 |
| 18 | 7.30 | 14.20 | 3.65 | 13.50 | 39.70 | 0.26 | 1.19 | 1.34 | 10.76 |
| 19 | 0.00 | 12.00 | 9.99 | 9.56 | 46.90 | 0.57 | 0.93 | 0.09 | 3.67 |
| 20 | 0.00 | 12.60 | 12.10 | 0.18 | 42.60 | 0.13 | 1.05 | 0.25 | 1.82 |

TABLE 4

| | | | | | Empirical Formula Atomic Ratio | | |
|---|---|---|---|---|---|---|---|
| Exp. No. | Atoms per molecule | | | | F/Al | Na + Mg / Al | X-Ray Identification Structure |
| | Na | Mg | Al | F | | | |
| 1 | 1.00 | 1.75 | 3.44 | 13.00 | 3.00 | 0.80 | RALSTONITE (MM) |
| 2 | 1.68 | 1.00 | 2.63 | 10.89 | 4.14 | 1.02 | RALSTONITE (MM) |
| 3 | NA 0.61 | MG 1.00 | AL 1.89 | F 6.68 | 3.55 | .85 | RALSTONITE (MM) |
| 4 | NA 0.01 | MG 1.00 | AL 1.00 | F 4.88 | 4.88 | 1.00 | TVA RALSTONITE (MM) |
| 5 | NA 7.98 | MG 1.00 | AL 4.60 | F 20.46 | 4.45 | 1.95 | RALSTONITE (MM) |
| 6 | NA 4.99 | MG 0.60 | AL 3.00 | F 13.32 | 4.45 | 1.68 | CHIOLITE (MM), CRYOLITE (M) |
| 7 | NA 1.58 | MG 1.00 | AL 3.39 | F 10.16 | 2.99 | .76 | SAMPLE UNSUITABLE FOR XRD ANALYSIS |
| 8 | NA 3.94 | MG 1.00 | AL 3.90 | F 11.01 | 2.82 | 1.27 | RALSTONITE (MM), CHIOLITE (M) |
| 9 | NA 0.01 | MG 1.00 | AL 1.42 | F 6.13 | 4.32 | 0.71 | TVA RALSTONITE (MM) CHIOLITE (M) |
| 10 | NA 1.16 | MG 1.00 | AL 1.51 | F 4.37 | 2.89 | 1.43 | CHIOLITE (MM), RALSTONITE (M) |
| 11 | NA 1.70 | MG 1.00 | AL 2.30 | F 10.08 | 4.38 | 1.17 | RALSTONITE (MM) CHIOLITE (M) |
| 12 | NA .01 | MG 1.06 | AL 1.00 | F 5.68 | 5.68 | 1.06 | TVA RALSTONITE (MM) |
| 13 | NA .01 | MG 1.09 | AL 1.00 | F 4.49 | 4.49 | 1.10 | TVA RALSTONITE (MM) |
| 14 | NA 4.66 | MG 1.0 | AL 2.81 | F 9.54 | 3.39 | 2.01 | CHIOLITE (MM) |
| 15 | NA 1.03 | MG 1.00 | AL 1.14 | F 5.82 | 5.10 | 1.78 | RALSTONITE (MM) |
| 16 | NA 1.76 | MG 1.00 | AL 2.91 | F 11.92 | 4.10 | .95 | RALSTONITE (MM) |
| 17 | NA 9.56 | MG 1.00 | AL 5.08 | F 18.90 | 3.72 | 2.08 | CHIOLITE (MM) RALSTONITE (M) |
| 18 | NA 3.91 | MG 1.00 | AL 3.51 | F 13.92 | 3.96 | 1.40 | CHIOLITE (MM) RALSTONITE (MM) |
| 19 | NA | MG | AL | F | 5.56 | 1.86 | RALSTONITE (MM) |

TABLE 4-continued

| Exp. No. | Atoms per molecule | | | | Empirical Formula Atomic Ratio | | X-Ray Identification Structure |
|---|---|---|---|---|---|---|---|
| | Na | Mg | Al | F | F/Al | (Na + Mg)/Al | |
| 20 | 1.01 NA .01 | 1.00 MG 1.06 | 1.08 AL 1.00 | 6.01 F 4.80 | 4.80 | 1.07 | TVA RALSTONITE (MM) |

| | Separation - Liquid - Solid (Wt %) | | | | | | | |
|---|---|---|---|---|---|---|---|---|
| Exp. No. | $P_2O_5$ | | Fe | | Si | | $SO_4$ | |
| | Liq. | Solid | Liq. | Solid | Liq. | Solid | Liq. | Solid |
| 1 | 97.80 | 2.20 | 97.18 | 2.82 | 56.77 | 3.23 | 98.76 | 1.24 |
| 2 | 92.68 | 7.32 | 92.23 | 7.77 | 78.08 | 21.92 | 95.26 | 4.74 |
| 3 | 98.67 | 1.33 | 98.74 | 1.26 | 97.17 | 2.83 | 98.39 | 1.61 |
| 4 | 100 | 0.00 | 99.59 | 0.41 | 94.45 | 5.55 | . | . |
| 5 | 99.07 | 0.93 | 96.29 | 3.71 | 83.88 | 16.12 | 98.45 | 1.55 |
| 6 | 100 | 0.00 | 90.17 | 9.83 | . | . | 86.22 | 13.78 |
| 7 | 62.68 | 37.32 | 57.90 | 42.10 | 73.16 | 26.84 | 64.44 | 35.56 |
| 8 | 99.43 | 0.57 | 98.22 | 1.78 | 83.11 | 16.89 | 96.51 | 3.49 |
| 9 | 99.81 | 0.19 | 97.31 | 2.69 | 100 | 0.00 | 98.91 | 1.09 |
| 10 | 98.67 | 1.33 | 92.11 | 7.89 | . | . | 97.17 | 2.83 |
| 11 | 98.41 | 1.59 | 97.75 | 2.25 | 28.63 | 71.37 | 99.63 | 0.37 |
| 12 | 99.77 | 0.23 | 99.55 | 0.45 | 45.66 | 54.34 | 99.58 | 0.42 |
| 13 | 99.82 | 0.18 | 98.39 | 1.61 | 60.97 | 39.03 | 99.87 | 0.13 |
| 14 | 98.90 | 1.10 | 89.45 | 10.55 | 29.40 | 60.60 | 98.27 | 1.73 |
| 15 | 99.83 | 0.17 | 98.93 | 1.07 | 86.39 | 13.61 | 98.86 | 1.14 |
| 16 | 99.67 | 0.33 | 98.25 | 1.75 | 96.44 | 3.56 | 91.17 | 8.83 |
| 17 | 98.37 | 1.63 | 80.44 | 19.56 | 36.56 | 63.44 | 95.02 | 4.98 |
| 18 | 96.80 | 3.20 | 95.63 | 4.37 | 24.52 | 65.40 | 94.30 | 5.70 |
| 19 | 100 | 0.00 | 96.76 | 3.24 | 77.63 | 22.37 | 99.81 | 0.19 |
| 20 | 100 | 0.00 | 99.63 | 0.37 | 67.24 | 32.76 | 99.80 | 0.20 |

TABLE 6

| | Separation - Liquid - Solid (Wt %) | | | | | | | |
|---|---|---|---|---|---|---|---|---|
| Exp. No. | Al | | Mg | | Na | | F | |
| | Liq. | Solid | Liq. | Solid | Liq. | Solid | Liq. | Solid |
| 1 | 41.36 | 58.64 | 1.88 | 98.12 | 20.46 | 79.54 | 68.41 | 31.59 |
| 2 | 10.85 | 89.15 | 0.79 | 99.21 | 7.73 | 92.27 | 31.45 | 68.55 |
| 3 | 56.28 | 43.72 | 36.01 | 63.99 | 28.17 | 71.83 | 55.52 | 44.48 |
| 4 | 63.27 | 36.73 | 65.21 | 34.79 | 0.00 | 100.00 | 49.52 | 50.48 |
| 5 | 6.24 | 93.76 | 51.76 | 48.24 | 8.27 | 91.73 | 27.66 | 72.34 |
| 6 | 37.84 | 62.16 | 35.92 | 64.08 | 36.76 | 63.24 | 21.25 | 78.75 |
| 7 | 16.54 | 83.46 | 1.01 | 98.99 | 5.64 | 94.36 | 34.96 | 65.04 |
| 8 | 16.01 | 83.99 | 0.87 | 99.13 | 5.28 | 94.72 | 60.49 | 39.51 |
| 9 | 27.57 | 72.43 | 33.43 | 66.57 | 90.90 | 9.10 | 39.43 | 60.57 |
| 10 | 0.00 | 100.00 | 0.73 | 99.27 | 25.74 | 74.26 | 21.51 | 78.49 |
| 11 | 50.91 | 49.09 | 38.71 | 61.29 | 50.51 | 49.49 | 44.50 | 55.50 |
| 12 | 9.66 | 90.34 | 10.06 | 89.94 | 70.72 | 29.28 | 22.72 | 77.28 |
| 13 | 5.54 | 94.46 | 5.09 | 94.91 | 88.24 | 11.76 | 40.67 | 59.37 |
| 14 | 1.83 | 98.17 | 1.10 | 98.90 | 10.44 | 89.56 | 42.63 | 57.37 |
| 15 | 77.70 | 22.30 | 81.54 | 18.46 | 81.69 | 18.31 | 68.77 | 31.26 |
| 16 | 17.54 | 82.46 | 0.57 | 99.43 | 5.84 | 94.16 | 66.29 | 33.71 |
| 17 | 1.08 | 98.92 | 8.01 | 91.99 | 9.68 | 90.32 | 17.29 | 82.71 |
| 18 | 26.41 | 73.59 | 1.95 | 98.05 | 9.82 | 90.18 | 21.36 | 78.64 |
| 19 | 4.66 | 95.34 | 14.13 | 85.87 | 19.32 | 80.68 | 25.95 | 74.05 |
| 20 | 49.75 | 50.25 | 50.77 | 49.23 | 90.98 | 9.02 | 34.75 | 65.25 |

What is claimed is:

1. A process for removing dissolved aluminum and magnesium from impure aqueous phosphoric acid containing dissolved aluminum, iron, silicon, fluorine and magnesium values, said process comprising
   (a) adding a fluorine-containing compound selected from the group consisting of calcium fluoride, synspar, and sodium fluoride and a sodium-containing compound selected from the group consisting of sodium fluoride, sodium carbonate, sodium hydroxide and sodium sulfate to said impure aqueous phosphoric acid in amounts effective to cause the formation of a solid compound comprising sodium, aluminum, magnesium and fluorine; and
   (b) separating said solid compound from said impure aqueous phosphoric acid to obtain an aqueous phosphoric acid containing less aluminum and magnesium than did said impure aqueous phosphoric acid.

2. The process of claim 1 wherein said impure aqueous phosphoric acid analyzes in the range of about 22% by weight to about 52% by weight of $P_2O_5$.

3. The process of claim 1 wherein said impure aqueous phosphoric acid has not been concentrated by evaporation of water and silicon tetrafluoride therefrom.

4. The process of claim 1 wherein said solid comprising sodium, aluminum, magnesium and fluorine has an X-ray diffraction pattern similar to that of TVA ralstonite.

5. The process of claim 1 wherein said impure aqueous phosphoric acid contains sufficient dissolved magnesium to cause the formation of a solid compound comprising sodium, magnesium, aluminum and fluorine, and corresponds approximately to the formula NaMgAP(F,OH)$H_2O$.

6. The process of claim 1 wherein said added fluorine-containing compound also contains calcium.

7. The process of claim 6 wherein sulfuric acid is added to said impure aqueous phosphoric acid in an amount at least approximately ionically equivalent to the fluorine in said fluorine-containing compound.

8. The process of claim 6 wherein sulfuric acid is added to said impure aqueous phosphoric acid in an amount approximately ionically equivalent to the calcium in said fluorine-containing compound which also contains calcium.

9. The process of claim 1 wherein said impure aqueous phosphoric acid is a component of a solid calcium sulphate-containing slurry produced by the action of sulphate ion on a solution of a calcium phosphate-containing mineral in aqueous phosphoric acid.

10. The process of claim 1 wherein said impure aqueous phosphoric acid is the product of separation of solid calcium sulphate from a slurry comprising impure aqueous phosphoric acid and solid calcium sulphate.

11. The process of claim 1 wherein said effective amount causes formation of a solid compound consisting essentially of sodium, aluminum magnesium and fluorine.

12. The process of claim 6 wherein said added fluorine-containing compound which also contains calcium comprises a solid produced by contacting phosphoric acid plant pond water with at least one member of the class selected from lime and limestone.

13. The process of claim 12 wherein said added sodium-containing compound comprises sodium hydroxide.

14. The process of claim 12 wherein said added sodium-containing compound comprises sodium sulfate.

* * * * *